US006824329B2

United States Patent
Van Bijsterveld et al.

(10) Patent No.: US 6,824,329 B2
(45) Date of Patent: Nov. 30, 2004

(54) METHOD AND APPARATUS FOR INSTALLING A DUCT AROUND A LONGITUNAL MEMBER PRESENT AT THE STRETCH OF INSTALLATION

(75) Inventors: Cornelis Casparus Van Bijsterveld, Voorschoten (NL); Gérard Plumettaz, Bex (CH)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 10/412,719

(22) Filed: Apr. 11, 2003

(65) Prior Publication Data

US 2003/0198518 A1 Oct. 23, 2003

(30) Foreign Application Priority Data

Apr. 15, 2002 (EP) .............................. 02076431

(51) Int. Cl.⁷ ................................................ E02F 5/10
(52) U.S. Cl. ................................. 405/184; 254/134.3 R
(58) Field of Search ............................... 405/184, 174, 405/183.5, 184.2, 184.4, 18; 254/134.3 R, 134.4, 134.3 FT (56) References Cited

U.S. PATENT DOCUMENTS 4,488,477 A * 12/1984 Miyamoto .................. 92/85 R
4,527,775 A * 7/1985 Flowers ............... 254/134.3 FT
5,464,308 A   11/1995 Missout ....................... 405/183
5,639,183 A    6/1997 Griffioen et al. ............. 405/154
5,707,176 A *  1/1998 Okubo ......................... 405/184
6,047,954 A *  4/2000 Griffioen ................. 254/134.4
6,349,460 B1 * 2/2002 Eslambolchi et al. .... 29/407.04

FOREIGN PATENT DOCUMENTS

FR     2 774 521      8/1999
WO    WO 01/27433    4/2001

* cited by examiner

Primary Examiner—Heather Shackelford
Assistant Examiner—Lisa M Saldano
(74) Attorney, Agent, or Firm—Michaelson & Associates; Peter L. Michaelson (57) ABSTRACT

For installing a cable duct around a cable buried in the ground, the duct is propelled by a propelling device formed of a solenoid and a corresponding core member of a magnetic material, and a duct transporting device. The core member is provided with a coupling which couples to a free end of the cable. The solenoid is driven by a current so as to maintain, during operation, the free end of the longitudinal member, coupled to the core member, in a fixed position with respect to the transporting device. The propelling operation is supported by feeding a fluid under pressure through the duct, with the foremost end of the duct being provided with a spouting member. Suitable design of the core member in combination with a suitably varying current for driving the solenoid allows increased dynamic propelling operation and consequently improved performance.

41 Claims, 5 Drawing Sheets

METHOD AND APPARATUS FOR INSTALLING A DUCT AROUND A LONGITUNAL MEMBER PRESENT AT THE STRETCH OF INSTALLATION

A. BACKGROUND OF THE INVENTION

1. Field of the Invention

The invention is in the field of providing tubular elements generally indicated as ducts, such as e.g. for guiding and protecting cables in the ground. More particularly, it relates to a method and an apparatus for installing a duct around a longitudinal member.

2. Prior Art

A method of the above kind is known from U.S. Pat. No. 5,639,183. The known method is intended for installing a tubular cable-duct around a cable buried in the ground. The method includes steps of freeing a portion of the buried cable from the ground in a forward longitudinal direction of the cable, starting from a free end of the buried cable, and advancing a foremost end and subsequent portions of the cable-duct in the forward longitudinal direction of the cable over the portion of the cable freed from the ground, starting from the free end of the cable. The advancing of the duct is achieved by exerting pulling forces on the free end of the cable by means of a pulling wire passed through the duct via a rearmost end thereof, in combination with the exertion of pushing forces at the rearmost end of the duct. Simultaneously a liquid under pressure may be applied as a kind of drilling liquid, which is fed through the duct from the rearmost to the foremost end of the duct, and which flows out at the foremost end for locally freeing the cable from ground. In this manner, a duct, or a duct consisting of several coupled segments, may be installed underground over a great distance along an existing cable, without much excavation work being required for said purpose. After having been installed, the cable, if so desired, may be pulled out of the duct. An advantage of the known method is that curvy sections are easy to follow, without expensive positioning equipment. Disadvantages, however, are that the duct or duct segment which can be installed in one operation is rather limited in length, and that during operation at first the duct or duct segment has to be laid out above ground in its full length and be provided with a pulling wire of at least the same length. The latter, moreover, makes an installation of a duct directly from a reel, on which it generally will be delivered, impossible. Particularly this aspect makes preparation of the installation process very laborious. Furthermore, a well-sealing T-piece, which is required at the rearmost end of the duct for feeding the liquid under pressure together with passing the pulling wire into the duct, is technically quite troublesome, and in practice will lead to spill of liquid. Finally the known method uses a static pushing force at the rearmost end of the duct(segment). However a considerable part of the pushing force is needed for pushing aside the ground in front of the foremost end of the duct. Since the pushing force available at the foremost end of the duct depends on the loss of force through friction over the length of the duct, the total length of the duct which can be installed with the known method is limited also for this reason.

B. SUMMARY OF THE INVENTION

An object of the invention is to provide a method and an apparatus with which a duct can be installed in the ground, in which the disadvantages of the known techniques discussed above do not occur.

According to a first aspect a method is provided of the kind as indicated above, comprising a step of propelling the duct over a free end and further portions of the longitudinal member. The step of propelling can include, according to this aspect of the invention, a substep of pushing the duct by pushing means which engage locally on and at least partly around an outer surface of the duct in the neighbourhood of, optionally at least at a short distance from the free end of the longitudinal member inside the duct, and a substep of maintaining the free end of the longitudinal member in a substantially fixed position with respect to the pushing means using magnetic means. The magnetic means and the pushing means may be coupled either mechanically or via terra firma, or both. Preferably the magnetic means are electromagnetic means, which preferably include a core member and a solenoid means. A foremost end of the duct is led through the solenoid means. The core member is coupled to the free end of the longitudinal member and then inserted into the foremost end of the duct. Then the duct is pushed further through the solenoid means by the pushing means, and the solenoid means are driven by a current in such a manner that the core member is retained within the attractive range of influence of the solenoid means. In dependency of the kind of magnetic material of the core member the solenoid means may be driven by a direct current or a periodically varying current such as a common alternating current, or any combination thereof, and preferably in a controllable manner. The step of pushing may be carried out by rotating transport means such as caterpillar means. In special cases such as the case in which the longitudinal member is buried in the ground, the method preferably comprises an additional step of feeding a fluid under pressure through the duct, from a rearmost end to the foremost end of the duct, in order to support die propelling step. The duct is preferably supplied from a reel.

According to a second aspect of the invention an apparatus is provided of the kind as indicated above, comprising a duct propelling device which includes pulling means provided with coupling means for a tension-proof coupling to a free end of the longitudinal member, and pushing means for pushing the duct over the free end and further portions of the longitudinal member. The duct propelling device can include, according to the second aspect of the invention, a common housing provided with a duct transit channel. The pulling means include magnetic means provided with a duct transit channel surrounding part and a corresponding core member, preferably a solenoid means and a corresponding core member of a magnetic material, respectively. The pushing means include duct transporting means. The solenoid means and the transporting means have been arranged in the common housing around sections of the duct transit channel. The core member has been provided with coupling means for coupling to the free end of the longitudinal member, and the solenoid means have been arranged for being driven by a current in such a way that during operation the free end of the longitudinal member coupled to the core member is maintainable in a substantially fixed position with respect to the transporting means. In dependency of the kind of magnetic material of the core member the solenoid means have been arranged for being driven by a direct current or a periodically varying current such as a common alternating current, and preferably in a controllable manner. The pushing may be rotating transport means such as caterpillar means. In special cases such as the case in which the longitudinal member is buried in the ground, the apparatus preferably comprises additionally means for feeding a fluid under pressure through the duct, from a rearmost end to the foremost end of the duct, in order to support the operation of the propelling device.

A further object of the invention is to provide a method, with which the propelling step, and preferably also the step of feeding the fluid under pressure are carried out in a more dynamical way, instead of the static way of the known installation technique. In that especially the electromagnetic means are applied advantageously.

According to a third aspect of the invention a method is provided in which the solenoid means are driven by a periodically varying current in such a manner that the core member is alternately attracted and not, at least less strong attracted by the solenoid means. Preferably the core member is of a permanent magnetic material, and the solenoid means are driven by a varying current having a periodically inverting polarity, in such a manner that the core member is periodically attracted and repelled by the solenoid means. In a further preferred embodiment of the method the substep of pushing is carried out by shifting transport means which engage on the outer surface locally around the duct with a relative high friction as to block substantial sliding over the outer surface of the duct in a direction of installation and with relatively low friction for a smooth sliding over the outer surface of the duct in the opposite direction, the shifting transport means being rigidly coupled to the solenoid means. An advantage of such a coupling is that indirectly the pushing means are driven via the electromagnetic means and will need no separate drive means. In a still further preferred embodiment the step of feeding the fluid under pressure is carried out, in which the core member is coupled to the free end of the longitudinal member via spring means and is provided with unidirectionally operating piston means, in such a way that driving the solenoid means with said varying current causes pressure variations in the fluid, which pressure variations propagate through the fluid towards the foremost end of the duct. The furthering effect on the installation of the duct through the generation of such pressure variations in the fluid may still be increased by providing the foremost end of the duct with a spouting element having a shape which is extendable and retractable under such pressure variations.

According to a fourth aspect of the invention an apparatus is provided in which the solenoid means have been arranged for being driven by a periodically varying current for alternately attracting and non-attracting, at least less attracting the core member during installation. Preferably the core member is of a permanent magnetic material and the solenoid means have been arranged for being driven by a varying current having a periodically inverting polarity, for periodically repelling and attracting the core member. In a further preferred embodiment of the apparatus the pushing means are shifting transport means provided with seizing means for seizing locally the outer surface of the duct with a relative relatively high friction as to block substantially sliding over the outer surface of the duct in a direction of installation and with relatively low friction for a smooth sliding over the outer surface of the duct in the opposite direction. The shifting transport means are rigidly coupled to the solenoid means. Preferably, the seizing means include a mainly hollow cylindrical member provided around a section of the duct transit channel, rigidly coupled to the solenoid means, and provided on the inside with one-way grabber-like elements, in such a manner that a duct present in the transit channel can, at least substantially, freely be moved in the installation direction, but is blocked for movement in the other direction. In a still further preferred embodiment of the apparatus, the core member has been provided with unidirectionally operating piston means for fulfilling a unidirectional valve function for the fluid fed through the duct during installation of the duct and for generating pressure variations in the fluid when during operation the core member is periodically repelled and attracted by the solenoid means. In that the apparatus comprises preferably a spouting member arranged for being mounted on the foremost end of a duct to be installed and for spouting fluid which during operation is fed under pressure through the duct towards the foremost end of the duct, which spouting member has been provided with a shape which is extendable and retractable under pressure variations in the fluid fed under pressure.

Summarizing Various Advantages of the Invention

The duct can be installed from a reel, without previously pacing out any length of duct;

No need to pass a pulling wire through the full length of duct to be installed;

Feeding of fluid under pressure is easier to realize in a fluid-tight manner;

Exerting the forces on the foremost end of the duct in more dynamic manner achieves better performance (such as realization of larger distances and/or more troublesome stretches of installation);

At least one of the embodiments of the propelling device, i.e., the combination of solenoid means and shifting transport means, allows a very compact, solid and reliable construction, which needs only one (electrical) energy source, and which is very suitable for use in a manhole. From reference [2] a process and an apparatus are known for laying a duct in a furrow in the ground, in which magnetic means are used for, during laying, simultaneously pulling in a cable in the duct.

C. REFERENCES

[1] U.S. Pat. No. 5,639,183;
[2] U.S. Pat. No. 5,464,308.
The references have been incorporated by reference in the present application.

D. BRIEF DESCRIPTION OF THE DRAWING

The invention will be explained by reference to a drawing which comprises the following figures.

E. DETAILED DESCRIPTION

Embodiments of a method and an apparatus for installing a tubular element around a longitudinal member present at a stretch of installation in accordance with the invention are described below. All of the described embodiments are in principle applicable to install a tubular element around a longitudinal member buried in the ground. At least some of them will be moreover suitable for installing such an element around a longitudinal member lying on a bottom, e.g., of a trench, sewer or various kinds of waterways. In this a tubular element has to be understood any tubular element which is generally indicated as duct, such as e.g., for guiding and protecting cables, but also for guiding fluids (e.g., tap-water, natural gas, etc), in particularly but not exclusively buried in the ground. And a longitudinal member has to be understood as to be not only any cable already buried in the ground, but also any pipe or other tubular element already present at the stretch of installation and around which a new tubular element of larger diameter should be provided. Only for the sake of brevity and without any limitation, hereinafter the general terms 'tubular element' and 'longitudinal member' are indicated by the terms 'duct' and 'cable', respectively, the cable being described as buried in the ground. The described method is in principle applicable for installing ducts irrespective of their stiffness. However, not only for following any curves present in the longitudinal element over the stretch of installation, but, preferably, also for being supplied from a reel on which it usually is delivered, the duct to be installed requires in dependency of the application a certain flexibility. Further, a duct may be such that its wall is provided with one or more so-called microducts for guiding fluids or thin cable-like elements such as optical fibres. Moreover, for the installation method described hereinafter the ducts should be of a non-magnetic material. Therefore such ducts may be of common synthetic materials such as HDPE, etc.

Figure 1:
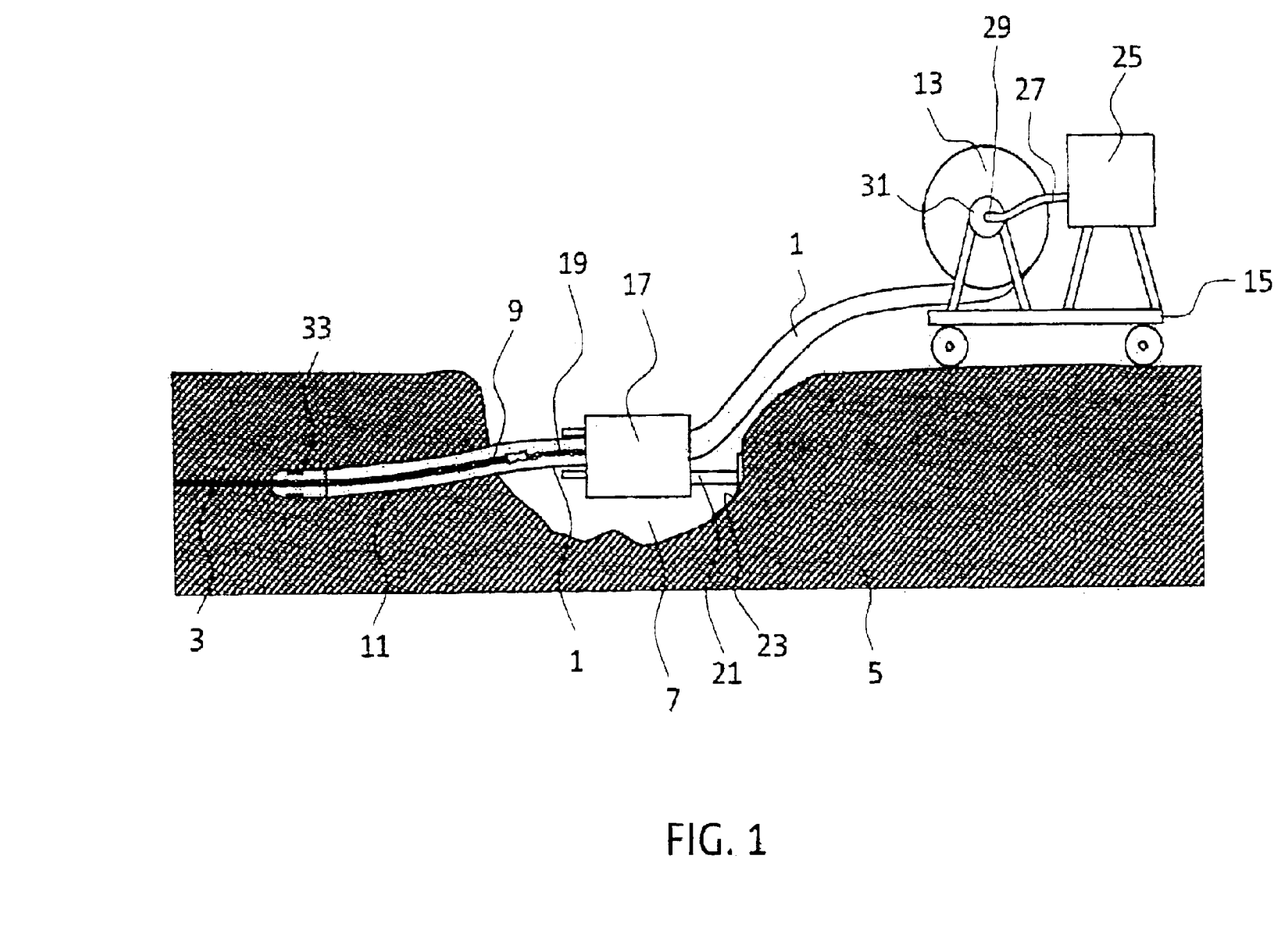
FIG. 1 shows diagrammatically a first set-up for installing a duct around a longitudinal element buried in the ground according to the invention.

FIG. 1 shows diagrammatically a first set-up for installing a duct 1 around a cable 3 buried in the ground 5. In a manhole 7 an end 9 of the cable 3 is freed from the ground. A foremost end 11 and following portions of the duct 1 are supplied from a reel 13, e.g. positioned on a displaceable platform 15 above-ground outside the manhole, through a propelling device 17 positioned in the manhole, over the free end 9 and further parts of the cable 3 buried in the ground 5. The propelling device 17 (see below for more details) has two functions. Firstly the device tautens the free end 9 of the cable by means of a pulling member 19 coupled to the free end 9 inside the duct. Secondly the device exerts pushing forces on the duct for advancing the duct further over the cable in the ground. For stability reasons the device may be provided with stud means 21, which preferably are, e.g. hydraulically, adjustable against a wall 23 of the manhole 7. From a reservoir 25, also positioned on the platform 15, a liquid under pressure is (or may be) supplied via a supply tube 27, which has a rotating, liquid-tight coupling 29 with a rearmost-end of the duct through a hollow axis 31 of the reel 13, through the duct. In using the duct as a feed line, the liquid then flows towards the foremost end 11 of the duct, where it flows out for weakening the ground and flushing it away. A spouting member 33 provided at the foremost end of the duct may further the flowing out and flushing away of the liquid.

It will be appreciated that, in the framework of the present invention, for the same purpose, instead of a liquid under pressure, as much a gas (e.g. compressed air) under pressure may be supplied through the duct towards the foremost end of the duct. For convenience' sake, however, the description is limited to the use of the liquid under pressure. Moreover in most of the applications a liquid under pressure will be preferred through its better controllability.

Figure 2:
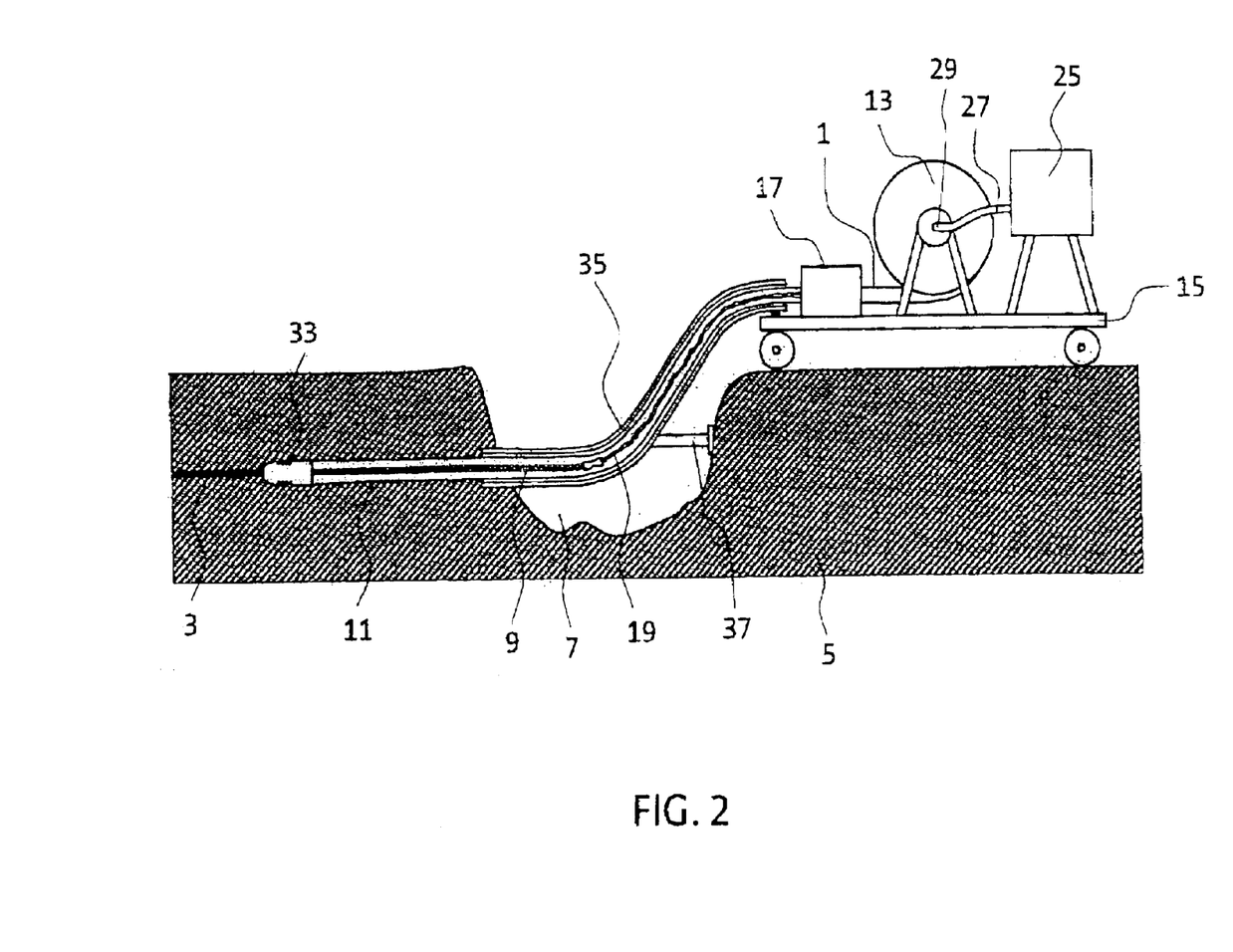
FIG. 2 shows diagrammatically a second set-up for installing a duct around a longitudinal element buried in the ground according to the invention.

FIG. 2 shows in a similar manner as FIG. 1 a second set-up for installing a duct 1 around a cable 3 buried in the ground 5. Instead of in the manhole, the propelling device 17 is also positioned on the displaceable platform 15 above ground level. The second set-up includes a guiding arm 35 for guiding the duct 1 leaving the propelling device 17 on the platform on ground level to the level of the cable 3 in the ground. The guiding arm 35 is provided with stud means 37 in a similar way as the propelling device in the first set-up. The guiding arm 35 has preferably a construction which has sufficient rigidity and yet allows a remodelling of its form/shape in such a way that the duct is guided along a smooth curve and with low friction from above ground level to the level of the cable 3 in the ground. The pulling member 19 is of course longer than in the first set-up.

Figure 3:
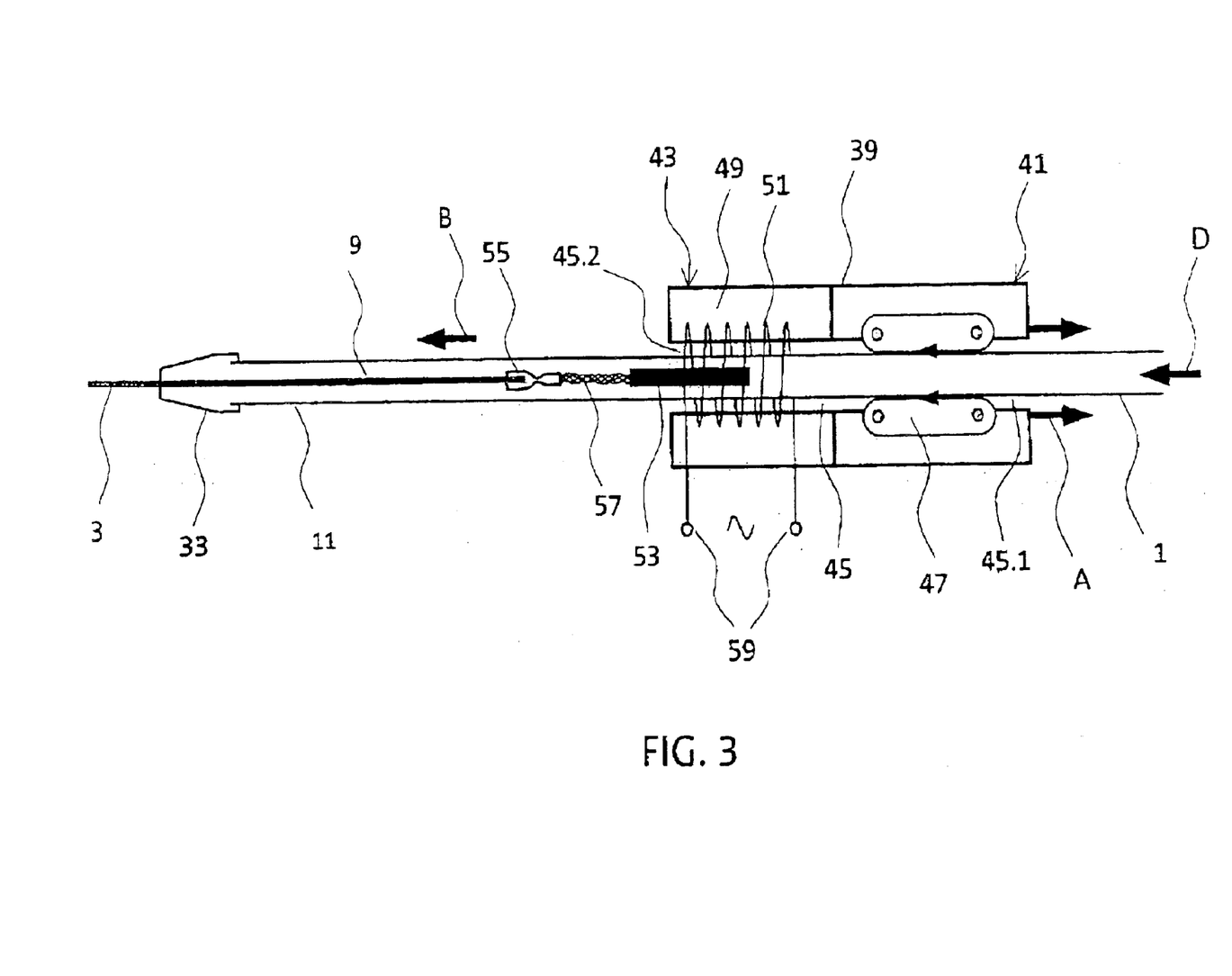
FIG. 3 shows schematically a first variant of a part of the set-up of FIG. 1 more in detail.

Now, with reference to FIG. 3, a first variant of the propelling device 17 according to the invention is described more in detail. The figure shows schematically a part of the set-up of FIG. 1. The propelling device 17 comprises, in a (preferably, but not necessary) common housing 39, a pushing part 41 and a pulling part 43, both of them arranged around a transit channel 45 for a duct 1 to be installed. The pushing part includes transport means 47, such as transport wheels or, as drawn in the figure, caterpillars which reach into a first section 45.1 of the transit channel 45 for transporting a duct through the transit channel. The pulling part 43 is constituted by magnetic means, in this variant an electromagnet, which includes a solenoid 49, provided with a coil 51 coaxially wound around a second section 45.2 of the transit channel 45, and a core member 53, provided with coupling means 55 for coupling, possibly via a pulling wire 57 with a length as needed, to a free end 9 of the cable 3. The core member 53 is of a non-permanent magnetic material, e.g. an iron core. The solenoid 49 is driven by an alternating current via contacts 59.

For installing a duct 1 over a cable 3 the propelling device 17 operates as follows. At first the core member 53 is coupled to the free end 9 of the cable 3. Then the device 17 is positioned near the free end 9 in such a way that the core member 53 can just be inserted into the second section 45.2 of the transit channel. Next a foremost end 11 of the duct 1 is taken from the reel 13 and led (by hand) successively through the first and the second sections 45.1/2 of the transit channel 45, and on the other side of the device provided with the spouting member 33, if it is used. Then the core member 53 is inserted, via the spouting member 33, into the foremost end 11 of the duct; then the electromagnet is powered, by which the core member is attracted into and retained, at least partly, in the second section 45.2 of the transit channel, the transport means 47 are put into operation, and the liquid under pressure is supplied. Through the operation of the transport means 47, the propelling device 17 will want to move away from a position, in which the core member 53 with the coupled free end 9 of the cable is retained, into the direction (arrow A) from which the duct is supplied. The result is that pushing forces are exerted on the duct into the direction of installation (arrow B), while simultaneously the cable is tautened at the free end coupled to the core member. If and as long as these resulting pushing forces are large enough to overcome any opposing friction forces, the duct will be advanced and slid further over the free end 9 and further parts of the cable 3 in the ground. The working of the electromagnet guarantees a static position of the solenoid 49, and, by means of its coupling (through the common housing 39) with the transport means 47, also of the propelling device as a whole with respect to the free end of the cable. Therefore the device requires merely a vertical support, which, however for stabilizing reasons only, may include an anchorage in the ground, e.g., through means such as the stud means 21 (FIG. 1). In case such an anchoring enables a full compensation of the pushing forces, a means is provided for separately regulating the pulling forces (as provided by the electromagnet, i.e., solenoid 49 and core member 53) and the pushing forces (as provided by the transport means 47). This offers the opportunity to optomize the installation process, which is the more important the more curvy the installation stretch is.

Also a permanent magnet is useable as a core member in combination with a direct current of suitable direction and magnitude for powering the solenoid.

The propelling device operates in the same way in case the device is reversed 180° with respect to the installation direction under reversion of the transporting direction of the transport means, and of the direction of the possibly used direct current.

It will be appreciated that more generally, for using attractive and/or repulsive effects of forces generated by or derived from magnetic fields, minimally two magnetic fields are required. Such fields may be fields generated by permanent magnets, or fields generated electrically, or a combination of both. This means that instead of the solenoid means also a permanent magnet or a suitable composition of permanent magnetic pieces may be used. Even, at least theoretically, the core member may be designed with a suitably current-driven solenoid. Also the solenoid means may include two suitably current-driven solenoids, around two spaced apart sections of the transit channel, between which the core member can be retained. Consequently, within the context of the present invention, the scope of the expression 'magnetic means' should be understood in a sense as to comprise all these possibilities, whereas the expression 'electromagnetic means' should be understood as to indicate the possibilities in which at least one of the fields is generated electrically, i.c. using suitably current-driven solenoid means.

The use of a solenoid around a section of the transit channel 47, however, allows powering with a more specific varying current in order to make the resulting pushing forces on the duct more dynamically, which will improve the installation process. Such resulting dynamic pushing forces may be achieved, e.g., by superimposing dynamic push/pull forces (through the electromagnet) on top of a constant push force (through the cater pillar). Such superposition can be realized in a very simple way, e.g., by means of short periodic interruptions of suitable duration in the applied current. In general such a periodically varying current should be such that, related to the magnitude of the pushing forces applied by the pushing part, the core member is still retained within the attractive range of influence of the solenoid. Particularly in combination with the use of a liquid under pressure and the spouting member 33 at the foremost end 11 of the duct, such dynamic pushing forces may improve the pushing away of the ground locally and thus further the installation. However, with increasing length of the duct already applied over the cable, the effectiveness of such dynamic pushing forces will relatively quickly decrease. However, the effectiveness will be furthered, when such dynamically varying pushing forces are attended with similar dynamic variations in pressure of the bore liquid.

Figure 4:
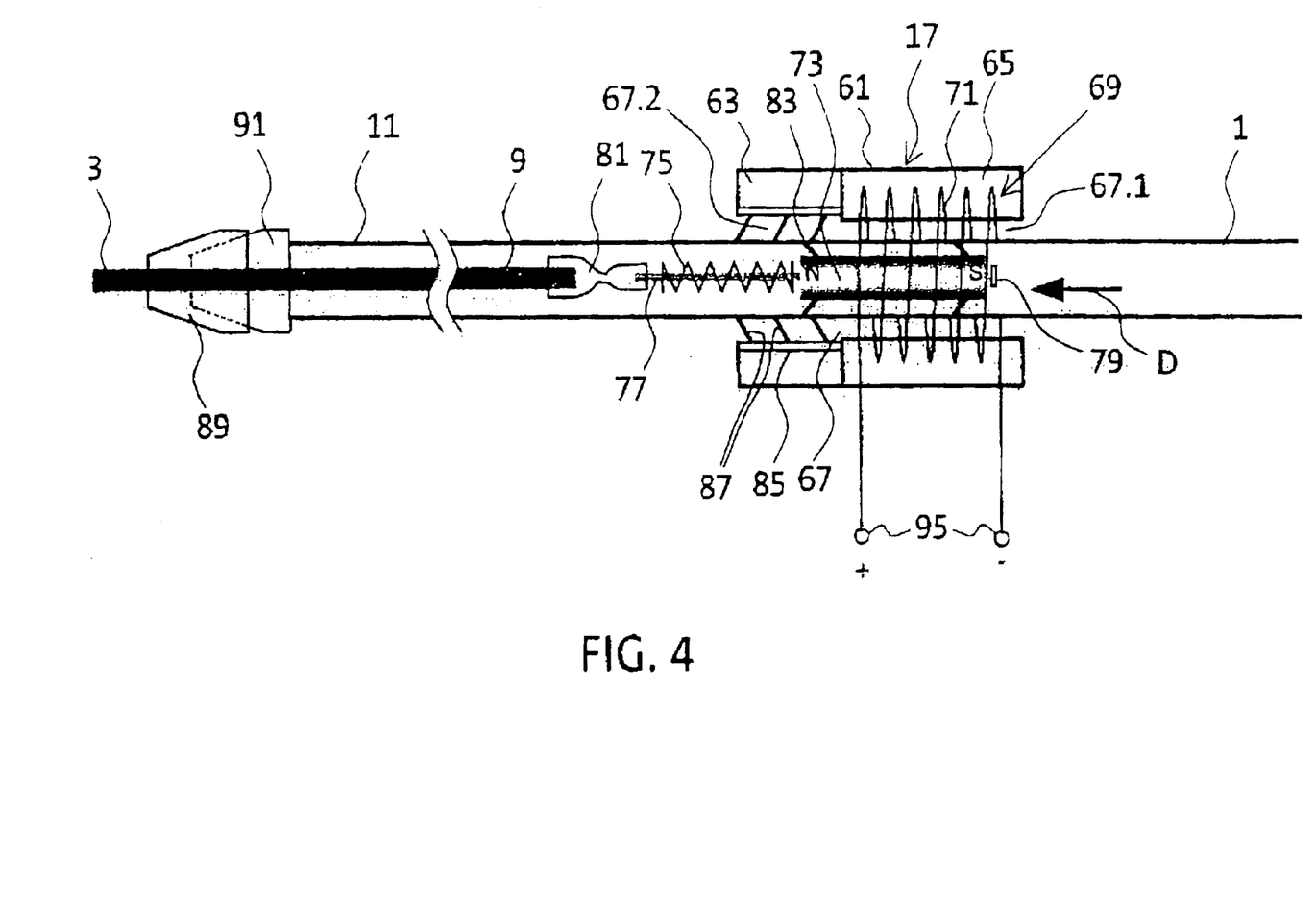
FIG. 4 shows schematically a second variant of a part of the set-up of FIG. 1 more in detail in a first stage of operation.
Figure 5:
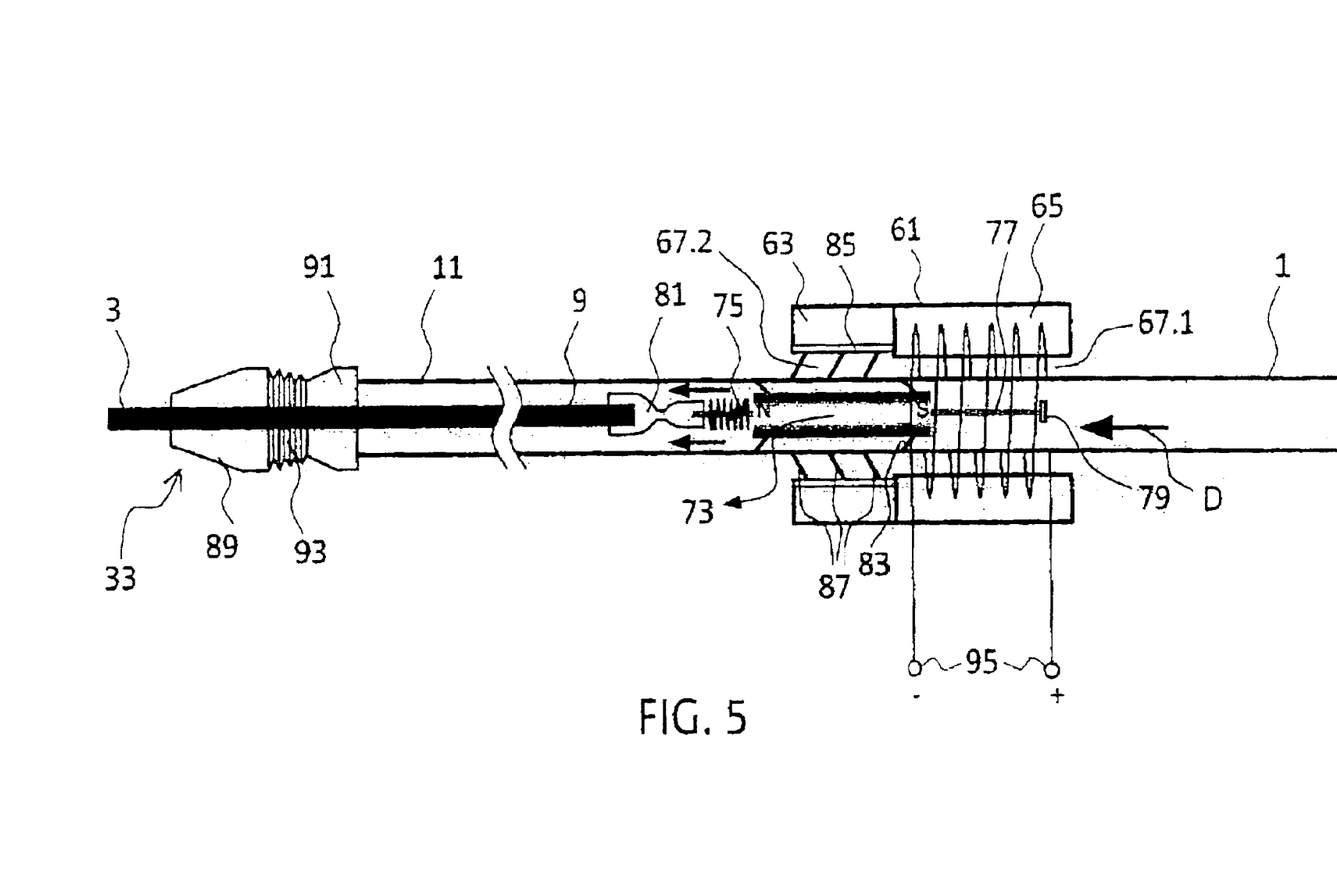
FIG. 5 shows schematically the second variant in a similar way as FIG. 4 in a second stage of operation.

Now, with reference to FIG. 4 and FIG. 5, an embodiment is described, which allows a combination of dynamic varying of the pushing forces on the duct and dynamic variations in the pressure of the liquid. To this end these figures show schematically a second variant of a part of the set-up of FIG. 1 more in detail in a first and a second stage of operation, respectively. The propelling device 17 again comprises, in a common housing 61, a pushing part 63 and a pulling part 65, both of them arranged around a transit channel 67 for a duct 1 to be installed. The pulling part 65 is again constituted by an electromagnet which includes a solenoid 69, provided with a coil 71 coaxially wound around a first section 67.1 of the transit channel 67, and a core member 73. The core member 73 is a permanent magnet having a mainly cylindrical body, which together with a spring 75 is coaxially slideable mounted on a slide bar 77, which on one side has been provided with a blocking member 79 and on the other side has been coupled by means of a coupling member 81 to the free end 9 of the cable 3. The core member 73, around its cylindrical surface, has been provided with piston rings 83 which fit within the duct 1 to be installed in such a way that they fulfil a unidirectional valve function. The pushing part 63 is constituted by a mainly hollow, e.g., cylindrical, member 85 which is an extension of the pulling part 65 around a second section 67.2 of the transit channel 67. Inside the hollow member 85 so-called one-way grabbers 87 has been provided, which are able to engage with a duct present in the transit channel 67 in such a way that the duct can, at least substantially, freely be moved or shifted in the installation direction, but is blocked for movement in the other direction. A bore liquid under pressure, e.g., bentonite, is supplied from the reservoir 25 (shown in FIG. 1), which flows through the duct (arrow D) into the direction of the foremost end 11 of the duct. The spouting member 33, mounted on the foremost end 11 of the duct 1, is constituted, e.g., by two hard sectional pieces 89 and 91 connected with an accordion-like connection piece 93 as pictured, at least in such a way that at least in the direction of installation the spouting member 33 is extendable under pressure increasing variations in the bore liquid flowing through the spouting member during installation, and retractable when the pressure decreases e.g., as a consequence of a further propelling of the foremost end of the duct. The solenoid, 69 is driven by a suitable current via contacts 95.

For installing a duct 1 over a cable 3 the second variant embodiment as pictured in FIG. 4 and FIG. 5 operates as follows. At first the spouting member 33 is shifted over the free end 9 of the cable 3 and the core member 73 is coupled via the slide bar 77 and the coupling member 81 to the free end 9 of the cable 3. Then the device 17 is positioned near the free end 9 in such a way that the core member 73 can just be inserted into the first section 67.1 of the transit channel 67. Next a foremost end 11 of the duct 1 is taken from the reel 13 and led (by hand) successively through the first and the second sections 67.1/2 of the transit channel 67. Then the core member 73 is inserted into the foremost end 11 of the duct. Then the foremost end 11 of the duct is provided with the spouting member 33, and as far as possible shifted by hand further over the cable; then the electromagnet is temporarily (at first) powered with a direct current, in such a way that the core member is attracted into and retained, at least partly, in the first section 67.1 of the transit channel 67, and the liquid under pressure is supplied. Then the electromagnet is driven by the proper operating current via the contacts 95. This operating current may be a reversible direct current, controlled by an electro/electronic control unit (not shown), to which the electric power is provided by, e.g., mains or batteries (equally not shown).

The principle of this type of electro magnetic propelling device works in three stages per period, in such a way that a kind of peristaltic movement results:

Stage 1: the operating current through the coil has a first, e.g. +/−, polarity in such a way that the permanent magnet (core member 73) will want to move towards the free end 9 of the cable (to the left in the drawing) and the solenoid 69 in the opposite direction (to the right in the drawing). FIG. 5 shows stage 1.

Stage 2: the operating current is switched off for a suitably short time ($\Delta t \geq 0$): the permanent magnet returns to a position, in which the permanent magnet lies pushed against the blocking member 79 by spring load, as shown in FIG. 4.

Stage 3: the operating current is reversed with a second, i.c. −/+ polarity in such a way that the permanent magnet tends to move away from the free end 9 of the cable (to the right in the drawing) and the solenoid tends to move towards the free end (to the left in the drawing). FIG. 4 shows stage 3.

Now more in details:

Stage 1: When the operating current with the first (+/−) polarity is applied to the contacts 95 of the solenoid 69, the piston-like core member 73 moves from right to left over the slide bar 77, and causes a liquid pressure pulse transporting an (additional) amount of liquid towards the spouting nozzle. As the movement of the piston-like core member 73 is hindered by the liquid pressure build-up, the electromagnetic force on the core member 73 will result in a reaction force urging the solenoid 69 to the right at the same time (FIG. 5). The liquid pressure pulse from the piston-like core member 73 will cause the spouting nozzle 33 to extend and 'hammer' against the soil in front of it, while at the same time, the soil is weakened and removed by fluid jetting through the spouting openings in the spouting nozzle.

Stage 2: When the operating current through the solenoid 69 is turned off, the spring 75 over the slide bar 77 causes the core member 73 to return to its position against the blocking member 79 (as shown in FIG. 4). With this return movement, the unidirectional piston function of the core member 73 will allow a new portion of fluid to flow to and to be stored at the other (left) side of the piston-like core member 73.

Stage 3: When the operating current is applied to the solenoid 69 with the second (−/+) polarity, a pulling force is imposed on the slide bar 77 and thus on the cable 3, pulling it straight. This pulling force causes a counteracting force in the solenoid 69, and consequently in the hollow member 85 with the grabbers 87 in the installation direction (to the left), and as the grabbers 87 hold the duct 1, the duct is propelled in the installation direction, at the same time compressing the spouting nozzle 33, at the foremost end 11 of the duct, into it's its retracted state (FIG. 4).

It is appreciated that the efficiency of the implementation of an electro magnetic propelling as described with reference to FIG. 4 and FIG. 5, will depend on an optimal choice of dimensions, weights, spring load, frictions and driving forces (control of the operating current), which, in turn, will depend on the circumstances of the installation, which moreover may vary during installation. Further the movement of the core member 73 and the solenoid 69 should be well balanced. The length of the stroke, i.e., the measure of displacement of the core member 73 in the longitudinal direction, during Stage 2, will differ from the length of the stroke during Stage 3, because of the returning of the core member 73 under spring control during Stage 2. Also, the forces required to cause the fluid pulse and the movement into the installation direction (to the left) of the solenoid (against the orientation of the grabbers) during Stage 1, may differ from the forces needed to propel the duct during Stage 3. Apart from mechanical engineering, a balancing of these forces during installation may be achieved by electric/electronic control of the current driving the solenoid. This applies also for the other embodiments described with reference to FIGS. 1–3.

With suitably chosen dimensions the hollow member 85 may be mounted inside the solenoid, instead of as an extension piece thereof, thus decreasing the length of the propelling device in the installation direction. In such a case, of course, the hollow member should be of a material which is transparent for magnetic forces.

The dynamic pushing forces exerted by the pushing part 63 with the grabbers 87 may be supported by a constant pushing force exerted by additional, separately operating duct transporting means (e.g. such as the caterpillar means as shown in FIG. 3) positioned and suitable anchored between the propelling device 17 and the reel 13.

Other designs for the extendable and retractable shape of the spouting member may be armadillo-like, i.e. two hard pieces which are flexibly connected and overlap each other in retracted state, or balloon-like.

What is claimed is:

1. A method for installing a tubular element, of a kind generally indicated as a duct, situated externally around a longitudinal member, the method comprising a step of:
   propelling the duct over a free end and further portions of the longitudinal member, wherein the propelling step comprises the steps of:
   pushing the duct using pushing means which engage locally on and at least partly around an outer surface of the duct in a neighborhood of the free end of the longitudinal member situated inside the duct; and
   maintaining, through use of magnetic means, the free end of the longitudinal member in a substantially fixed position with respect to the pushing means.

2. The method recited in claim 1 wherein the magnetic means and the pushing means are coupled in at least one of two manners, the two manners being mechanically and via terra firma.

3. The method recited in claim 1 wherein the magnetic means are electromagnetic means.

4. The method recited in claim 3 wherein electromagnetic means comprise a core member situated inside the duct and coupled to the free end of the longitudinal member and solenoid means through which the duct is pushed by the pushing means, and the maintaining step is carried out by driving the solenoid means by a current in such a manner that the core member is retained within an attractive range of influence of the solenoid means.

5. The method recited in claim 4 wherein the solenoid means is driven with a direct current.

6. The method recited in claim 4 wherein the solenoid means is driven with an alternating current, the core member being formed of a non-permanent magnetic material.

7. The method recited in claim 4 wherein the solenoid means is driven with a controllable current.

8. The method recited in claim 4 wherein the propelling step is carried out dynamically by driving the solenoid means with a periodically varying current in such a manner that the core member is alternately attracted and not attracted.

9. The method recited in claim 8 wherein the core member is formed of a permanent magnetic material and the solenoid means is driven by a varying current, having a periodically inverting polarity, in such a manner that the core member is periodically repelled and attracted by the solenoid means.

10. The method recited in claim 8 wherein the pushing step is carried out by shifting transport means which engage with the outer surface locally around the duct with a relatively high friction as to block substantial sliding of the shifting transport means over the outer surface of the duct and in a direction of installation and to provide, with a relatively low friction, smooth sliding of the shifting transport means over the outer surface of the duct and in a direction opposite to the direction of installation, the shifting transport means being rigidly coupled to the solenoid means.

11. The method recited in claim 10 further comprising the step of feeding a fluid under pressure via a rearmost end of the duct and through the duct, said fluid flows outwards at the foremost end of the duct.

12. The method recited in claim 11 wherein the core member is coupled to the free end of the longitudinal member via spring means and provided with unidirectionally operating piston means such that driving the solenoid means with said varying current causes pressure variations in the fluid, which pressure variations propagate through the fluid towards the foremost end of the duct.

13. The method recited in claim 12 wherein the foremost end of the duct is provided with a spouting member having a shape which is extendable and retractable under the pressure variations.

14. The method recited in claim 1 wherein the pushing step is carried out by rotating transport means which engage with the outer surface of the duct.

15. The method recited in claim 1 further comprising the step of feeding a fluid under pressure, via a rearmost end of the duct and through the duct, which fluid flows outwards at a foremost end of the duct.

16. The method recited in claim 15 wherein the foremost end of the duct is provided with a spouting member through which the fluid outwardly flows.

17. The method recited in claim 15 wherein the fluid is a liquid.

18. The method recited in claim 1 wherein the duct is supplied from a reel.

19. The method recited in claim 18 wherein the propelling step is carried out by a propelling device containing the pushing means and the magnetic means.

20. The method recited in claim 19 wherein the propelling device is located and studded by stud means in a manhole in which the free end of the longitudinal member is accessible, and the duct is supplied from a reel located outside the manhole to the propelling device.

21. The method recited in claim 20 wherein additional pushing means are applied for supporting the propelling operation of the propelling device, said additional pushing means engage locally on the duct between the reel and the propelling device.

22. The method recited in claim 1 wherein the longitudinal member is a cable buried in ground.

23. The method recited in claim 22 wherein the duct is supplied from a reel to the propelling device and propelled further by the propelling device from outside a manhole, and is guided by a guiding member arranged in a smooth curve between the propelling device and a wall of the manhole through which the free end of the cable is accessible, the guiding member being studded by stud means in the manhole.

24. Apparatus for installing a tubular element of a kind generally indicated as a duct around a longitudinal member, the apparatus comprising:
  a duct propelling device having:
    pulling means provided with coupling means for a tension-proof coupling to a free end of the longitudinal member; and
    pushing means for pushing the duct over the free end and further portions of the longitudinal member;
  wherein the duct propelling device further comprises a common housing provided with a duct transit channel, the pulling means, having electromagnetic means provided with a duct transit channel surrounding part and a corresponding core member, and the pushing means comprise duct transporting means, the duct transit channel surrounding part and the transporting means being arranged in the common housing around sections of the duct transit channel, the core member being provided with coupling means for coupling to the free end of the longitudinal member, and the duct transit channel surrounding part being such that, during operation, the free end of the longitudinal member coupled to the core member is maintainable in a substantially fixed position with respect to the transporting means.

25. The apparatus recited in claim 24 wherein the duct transit channel surrounding part of the magnetic means comprise solenoid means drivable by a current, and the corresponding core member is formed of a magnetic material.

26. The apparatus recited in claim 25 wherein the solenoid means are arranged for being driven by a direct current.

27. The apparatus recited in claim 25 wherein the core member is formed of a non-permanent magnetic material and the solenoid means are arranged for being driven by an alternating current.

28. The apparatus recited in claim 25 wherein the solenoid means are arranged for being driven by a controllable current.

29. The apparatus recited in claim 25 wherein the solenoid means are arranged for being driven by a periodically varying current for alternately attracting and non-attracting.

30. The apparatus recited in claim 29 wherein the core member is formed of a permanent magnetic material and the solenoid means are arranged for being driven by a varying current, having a periodically inverting polarity, for periodically repelling and attracting the core member.

31. The apparatus recited in claim 29 wherein the transporting means comprise shifting transporting means provided with seizing means for locally seizing the outer surface of the duct with a relatively high friction so as to block substantial sliding of the shifting transporting means over the outer surface of the duct and in a direction of installation and to provide, with a relatively low friction, smooth sliding of the shifting transporting means over the outer surface of the duct and in the direction opposite to the direction of installation.

32. The apparatus recited in claim 31 wherein the seizing means comprise a mainly hollow cylindrical member, provided around a section of the duct transit channel, rigidly coupled to the solenoid means and internally having one-way grabber-like elements arranged in such a manner that a duct present in the transit channel can substantially be moved freely in the direction of installation but is blocked for movement in an opposite direction.

33. The apparatus recited in claim 24 wherein the transporting means comprise rotating transporting means.

34. The apparatus recited in claim 33 wherein the rotating transporting means comprise caterpillar means.

35. The apparatus recited in claim 24 wherein the transporting means comprise shifting transporting means.

36. The apparatus recited in claim 24 further comprising feed means for feeding a fluid under pressure, via a rearmost end of a duct, through the duct towards a foremost end of the duct.

37. The apparatus recited in claim 36 wherein the core member has unidirectionally operating piston means for providing a unidirectional valve function for the fluid fed through the duct during installation of the duct and for generating pressure variations in the fluid when, during operation, the core member is periodically repelled and attracted by the solenoid means.

38. The apparatus recited in claim 37 wherein the coupling means comprise spring means for a springy coupling of the core member to the free end of the longitudinal member.

39. The apparatus recited in claim 38 wherein the spring means comprise a spring and a slide bar, one end of the slide bar having a coupling member for coupling to a free end of the longitudinal member and another end of said slide bar having a blocking member, and the core member being coaxially and slideably mounted on the slide bar together with the spring such that in a condition of rest the core member is blocked by the blocking member.

40. The apparatus recited in claim 36 further comprising a spouting member mounted on the foremost end of a duct to be installed and for spouting fluid which, during operation, is fed under pressure through the duct towards the foremost end of the duct, said spouting member having a shape which is extendable and retractable under pressure variations in the fluid fed under pressure.

41. The apparatus recited in claim 40 wherein the spouting member has two sectional pieces connected with an accordion-like connecting piece.

* * * * *